United States Patent
Kim et al.

(10) Patent No.: US 10,155,441 B2
(45) Date of Patent: Dec. 18, 2018

(54) FUEL DOOR OPENER

(71) Applicants: Hyundai Motor Company, Seoul (KR); Kia Motors Corporation, Seoul (KR); Pyeong Hwa Automotive Co., Ltd., Daegu (KR)

(72) Inventors: Sin Kook Kim, Seoul (KR); In Hwang, Hwaseong-si (KR); Byung Joo Lee, Seoul (KR); Gi Won Kim, Hwaseong-si (KR); Byoung Haan Choi, Hwaseong-si (KR); Kyoung Hoon Park, Suwon-si (KR)

(73) Assignees: Hyundai Motor Company, Seoul (KR); Kia Motors Corporation, Seoul (KR); Pyeong Hwa Automotive Co., Ltd., Daegu (KR)

( * ) Notice: Subject to any disclaimer, the term of this patent is extended or adjusted under 35 U.S.C. 154(b) by 106 days.

(21) Appl. No.: 15/339,626

(22) Filed: Oct. 31, 2016

(65) Prior Publication Data
US 2017/0240040 A1    Aug. 24, 2017

(30) Foreign Application Priority Data
Feb. 24, 2016   (KR) .................. 10-2016-0021834

(51) Int. Cl.
*B62D 25/00*   (2006.01)
*B60K 15/05*   (2006.01)
*E05F 15/60*   (2015.01)

(52) U.S. Cl.
CPC .............. *B60K 15/05* (2013.01); *E05F 15/60* (2015.01); *B60K 2015/053* (2013.01);
(Continued)

(58) Field of Classification Search
CPC ............ B60K 15/05; B60K 2015/0584; B60K 2015/0569; B60K 2015/053; B60K 2015/0546; E05F 15/60; E05Y 2900/534
(Continued)

(56) References Cited

U.S. PATENT DOCUMENTS 5,816,643 A * 10/1998 Itou ..................... B60L 11/1818
                                                        296/97.22
6,234,557 B1 * 5/2001 Bae .................... B60K 15/0406
                                                        220/86.2
(Continued)

FOREIGN PATENT DOCUMENTS

JP      2005-171610 A    6/2005
KR      1998-023441 U    7/1998
(Continued)

*Primary Examiner* — Jerry E Redman
(74) *Attorney, Agent, or Firm* — Morgan, Lewis & Bockius LLP

(57) ABSTRACT

A fuel door opener may include a main body coupled in a fuel door housing, and disposed to face a hinge of a fuel door rotatably coupled at one side of the fuel door housing, a locking rod which is disposed to be movable between a locking position where the fuel door is locked and an unlocking position where the fuel door is unlocked in accordance with opened and closed states of the fuel door, and an opening detection switch disposed in the main body adjacent to the locking rod, and detecting the opened and closed states of the fuel door by selectively coming into contact with the locking rod as the locking rod is positioned at the unlocking position.

7 Claims, 3 Drawing Sheets

(52) U.S. Cl.
CPC ............... *B60K 2015/0546* (2013.01); *B60K 2015/0569* (2013.01); *B60K 2015/0576* (2013.01); *B60K 2015/0584* (2013.01); *E05Y 2900/534* (2013.01)

(58) Field of Classification Search
USPC .................................................... 296/97.22
See application file for complete search history.

(56) References Cited

U.S. PATENT DOCUMENTS

| | | | | |
|---|---|---|---|---|
| 6,808,226 | B2* | 10/2004 | Hirano | B60J 5/06 |
| | | | | 292/DIG. 46 |
| 8,028,780 | B2* | 10/2011 | Sagawa | B60K 15/05 |
| | | | | 180/65.27 |
| 8,720,968 | B2* | 5/2014 | Zalan | E05B 83/34 |
| | | | | 292/251.5 |
| 8,845,001 | B2* | 9/2014 | Kotama | B60L 11/1818 |
| | | | | 296/97.22 |
| 9,878,613 | B2* | 1/2018 | Yang | B60K 15/05 |
| 2002/0008402 | A1* | 1/2002 | Moll | B60K 15/05 |
| | | | | 296/97.22 |
| 2005/0194810 | A1 | 9/2005 | Beck | |
| 2005/0230999 | A1* | 10/2005 | Seto | B60K 15/05 |
| | | | | 296/97.22 |
| 2010/0072774 | A1* | 3/2010 | Bar | B60K 15/0406 |
| | | | | 296/97.22 |
| 2010/0187837 | A1* | 7/2010 | Danner | B60K 15/05 |
| | | | | 292/164 |
| 2014/0084620 | A1* | 3/2014 | Frommann | B60K 15/05 |
| | | | | 296/97.22 |
| 2015/0224872 | A1* | 8/2015 | Frommann | B60K 15/05 |
| | | | | 296/97.22 |
| 2015/0337569 | A1* | 11/2015 | Lim | E05B 83/34 |
| | | | | 292/197 |
| 2016/0375762 | A1* | 12/2016 | Lee | B60K 15/05 |
| | | | | 296/97.22 |
| 2017/0306665 | A1* | 10/2017 | Sonobe | E05B 83/34 |
| 2018/0079297 | A1* | 3/2018 | Lee | B60K 15/05 |

FOREIGN PATENT DOCUMENTS

| | | | | |
|---|---|---|---|---|
| KR | 1999-019247 A | 3/1999 | | |
| KR | 10-2009-0057750 A | 6/2009 | | |
| KR | 10-2013-0018060 A | 2/2013 | | |
| KR | 10-2015-0015054 A | 2/2015 | | |
| KR | 10-1509609 B1 | 4/2015 | | |
| KR | 10-2015-0089449 A | 8/2015 | | |
| WO | WO-2015105193 A1 * | 7/2015 | ............ | B60K 15/05 |
| WO | WO-2015162861 A1 * | 10/2015 | ............ | B60K 15/05 |

* cited by examiner

FUEL DOOR OPENER

CROSS-REFERENCE TO RELATED APPLICATION

The present application claims priority to Korean Patent Application No. 10-2016-0021834, filed Feb. 24, 2016, the entire contents of which is incorporated herein for all purposes by this reference.

BACKGROUND OF THE INVENTION

Field of the Invention

The present application relates to a fuel door opener. More particularly, it relates to a fuel door opener in which an opening detection switch is integrally mounted.

Description of Related Art

In general, a cap is attached to a fuel inlet of a vehicle, and a fuel door is provided to prevent damage to the cap.

Here, the fuel door has a structure in which the fuel door is fixed by a fuel door opener at normal times, and unfastened from the fuel door opener by an operational signal of a user and then opened toward the outside of the vehicle by elastic force of an elastic portion.

A method of operating the fuel door opener may be classified into a mechanical operating method in which the fuel door opener is directly connected with an operating button, which is provided on a driver seat, by a cable or the like, such that the fuel door opener is operated when a driver operates the operating button to pull the cable, and an electronic operating method in which the fuel door opener is configured to be operated by an electrical signal of a solenoid, a motor or the like, such that the fuel door opener is opened by operating a switch provided on a driver seat.

Meanwhile, in the case of the fuel door opener which is operated by the aforementioned electronic operating method, a switch, which detects opening of the fuel door based on a movement of a locking rod, and a locking system, which locks or unlocks the fuel door, are separately provided in a fuel door housing, but this structure may cause an increase in weight of the fuel door opener, and may cause difficulty in configuring a package layout of the fuel door opener.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a fuel door opener in which an opening detection switch mounted integrally in the fuel door opener selectively comes into contact with a locking rod as the locking rod moves in accordance with opened and closed states of a fuel door, and as a result, it is possible to easily check whether the fuel door is opened and closed even though an opening detection switch separately provided is omitted.

According to various aspects of the present invention, a fuel door opener may include a main body coupled in a fuel door housing, and disposed to face a hinge of a fuel door rotatably coupled at one side of the fuel door housing, a locking rod which is disposed to be movable between a locking position where the fuel door is locked and an unlocking position where the fuel door is unlocked in accordance with opened and closed states of the fuel door, and an opening detection switch disposed in the main body adjacent to the locking rod, and detecting the opened and closed states of the fuel door by selectively coming into contact with the locking rod as the locking rod is positioned at the unlocking position.

The main body may be disposed in the fuel door housing so that one end of the locking rod protrudes and is exposed from the fuel door housing.

The locking rod may include a contact member which protrudes on the fuel door housing to selectively contact a rod stopper provided on the fuel door, a movable member which is coupled to the contact member, has a contact guide disposed to set a contact range with the opening detection switch, and selectively moves to the locking position or the unlocking position as the rod stopper and the contact member come into contact with each other, and an elastic member coupled to an outer circumferential surface of the movable member, and providing elastic force to the movable member that moves from the locking position to the unlocking position.

The contact guide may be disposed as a groove in a longitudinal direction of the movable member so as to selectively come into contact with the opening detection switch in the contact range.

The opening detection switch may include a body disposed in the main body adjacent to the locking rod, and a detector hingedly coupled to the body to detect the opened state of the fuel door by being caught by the contact guide as the locking rod moves to the unlocking position.

The contact range may be a range in which the detector does not come into contact with the contact guide when the movable member moves to the locking position, and the detector comes into contact with the contact guide when the movable member moves to the unlocking position.

The rod stopper may include a catching groove formed so that the contact member is caught in the catching groove when the fuel door is closed, and allowing the movable member to be fixed at the locking position by pressing against the contact member.

According to various embodiments the present invention, the opening detection switch mounted integrally in the fuel door opener selectively comes into contact with the locking rod as the locking rod moves in accordance with opened and closed states of the fuel door, and as a result, it is possible to easily check whether the fuel door is opened and closed even though an opening detection switch separately provided is omitted.

Therefore, various embodiments of the present invention may implement an aesthetic external appearance of the fuel door, reduce costs/weight of the fuel door, make a configuration of a package layout excellent, and improve assembly and manufacturing properties.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
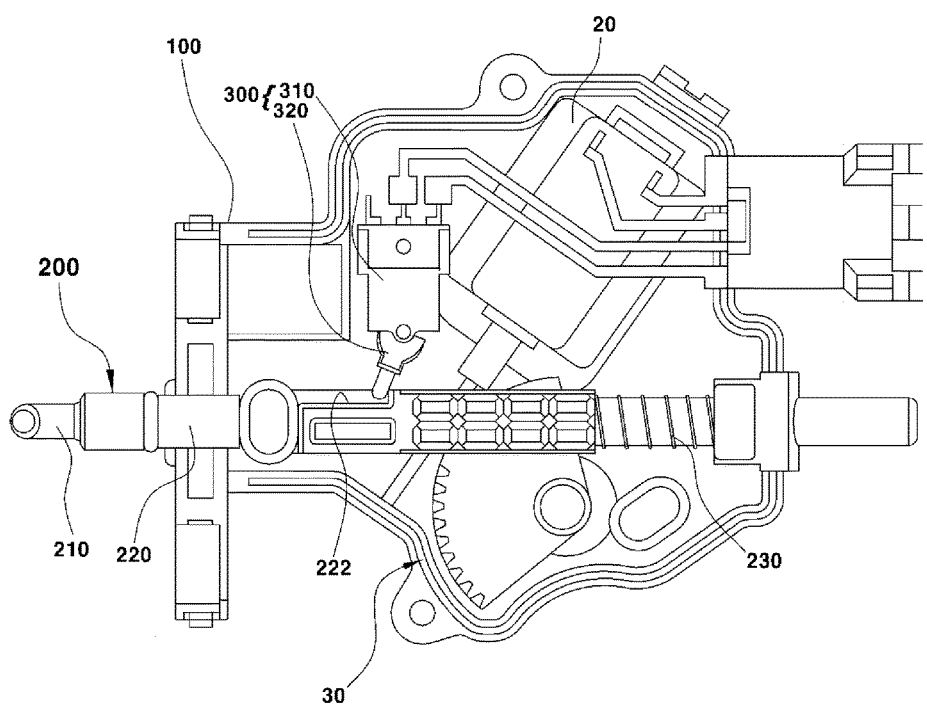
FIG. 1 is a view illustrating a state in which a fuel door opener according to various embodiments of the present invention opens a fuel door.

FIG. 1 is a view illustrating a state in which a fuel door opener according to various embodiments of the present invention opens a fuel door.

As illustrated in FIG. 1, a fuel door opener includes a main body 100, a locking rod 200, and an opening detection switch 300.

The main body 100 is coupled in a fuel door housing, and disposed to face a hinge of a fuel door 110 which is rotatably coupled at one side of the fuel door housing.

The main body 100 may be installed in the fuel door housing so that only one end portion of the locking rod 200 may be exposed to the outside from the fuel door housing.

The locking rod 200 has a predetermined length and is installed in the main body 100, and the locking rod 200 is installed to be movable between a locking position where the fuel door 110 is locked and an unlocking position where the fuel door 110 is unlocked in accordance with opened and closed states of the fuel door 110.

To this end, the locking rod 200 is provided with a contact member 210, a movable member 220, and an elastic member 230.

The contact member 210 protrudes on the fuel door housing so as to selectively come into contact with a rod stopper 12 provided on the fuel door 110.

Figure 2:
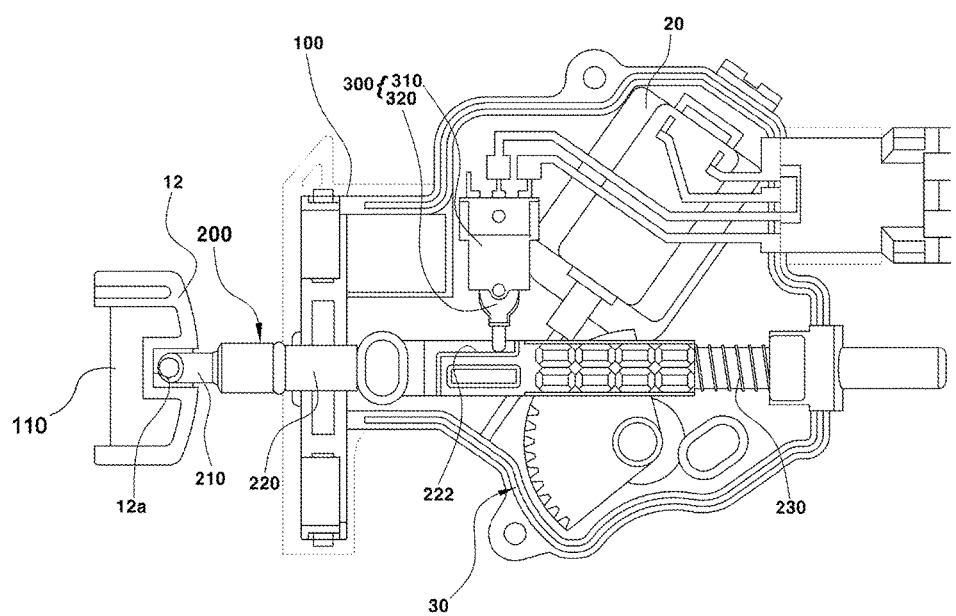
FIG. 2 is a view illustrating a state in which the fuel door opener according to various embodiments of the present invention closes the fuel door.
Figure 3:
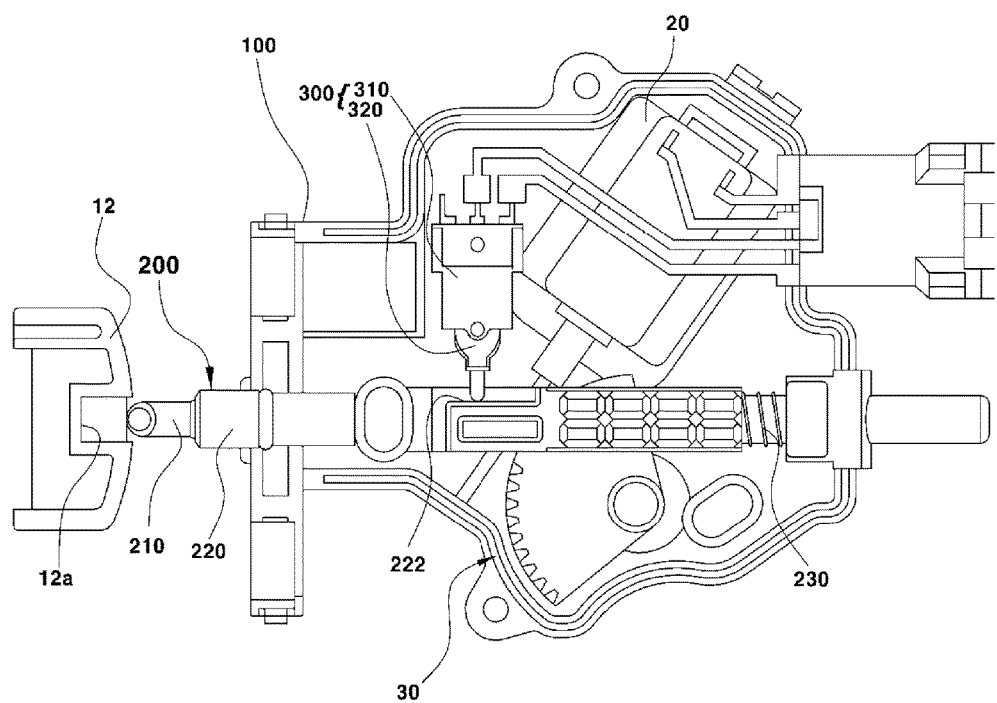
FIG. 3 is a view illustrating a process in which the fuel door opener according to various embodiments of the present invention opens and closes the fuel door.

That is, a catching groove 12a, which is formed to have a closed cross section, is provided in the rod stopper 12 so that the contact member 210 is caught by the catching groove 12a, and the catching groove 12a allows the movable member 220 to be fixed at the locking position by pressing the contact member 210 when the fuel door 110 is closed (refer to the character numbers of FIGS. 2 and 3).

The movable member 220 is coupled to the contact member 210 in the main body 100, and a contact guide 222, which sets a contact range with the opening detection switch 300 in a longitudinal direction, is installed in the form of a groove having a predetermined width.

An end portion of the contact guide 222, which selectively comes into contact with a detector 320 within the contact range, may be formed to be inclined upward, and as a result, when the movable member 220 moves, the detector 320 having a fixed height may easily come into contact with the contact guide 222 along an inclined surface.

Particularly, the contact range is set to a predetermined range in which the detector 320 of the opening detection switch 300 does not come into contact with the contact guide 222 when the movable member 220 moves to the locking position, and the detector 320 comes into contact with the contact guide 222 when the movable member 220 moves to the unlocking position.

The movable member 220 moves to the locking position or the unlocking position based on contact between the rod stopper 12 and the contact member 210.

That is to say, when the contact member 210 moves by the catching groove 12a when the fuel door 110 is closed, the movable member 220 moves rearward together with the contact member 210 and then is positioned at the locking position, and when the fuel door 110 is opened, the movable member 220 moves to the unlocking position by elastic force.

Here, the elastic member 230, which may provide elastic force when the movable member 220 moves, is provided on the locking rod 200, and the elastic member 230 contracts in the main body 100 when the movable member 220 is positioned at the locking position, and the elastic member 230 causes the movable member 220 to move to the unlocking position by elastic restoring force when the fuel door 110 is opened.

Meanwhile, the opening detection switch 300 is disposed in the main body 100 adjacent to the locking rod 200, and selectively comes into contact with the locking rod 200 when the locking rod 200 is positioned at the unlocking position, thereby detecting an opened or closed state of the fuel door 110.

To this end, the opening detection switch 300 has a body 310 and the detector 320.

The body 310 is disposed in the main body 100 adjacent to the locking rod 200.

The detector 320 is hingedly coupled to an end portion of the body 310, and caught by and comes into contact with the contact guide 222 as the locking rod 200 moves to the unlocking position, thereby detecting an opened state of the fuel door 110.

That is, when the locking rod 200 is positioned at the unlocking position, the contact member 210 is not pushed, and as a result, the detector 320 of the opening detection switch 300 is caught by one surface of the contact guide 222 as the locking rod 200 moves, and in this case, the opening detection switch 300 is turned on as the detector 320 and the locking rod 200 come into contact with each other, thereby generating a signal for opening the fuel door 110.

The signal for opening the fuel door 110 is displayed on a cluster of the vehicle, thereby allowing a driver to easily recognize the closed state of the fuel door 110.

The technology for recognizing the closed state of the fuel door 110 as described above is essentially applied to a plug-in hybrid electric vehicle (PHEV). The reason is to prevent the fuel door 110 from being opened until pressure in a fuel tank is reduced to a safe level when a driver operates a control button because there is concern that gas will be scattered and fuel will overflow due to high pressure in the fuel tank in the case of the PHEV vehicle. To this end, the closed state of the fuel door 110 needs to be effectively determined, and a switch signal needs to be provided to a body control module (BCM).

Recently, the technology for recognizing the closed state of the fuel door 110 is applied to a fuel cell electric vehicle (FCEV), an EV, or a vehicle having high-grade specifications as well as to the PHEV, and the technology for recognizing the closed state of the fuel door 110 has been applied to a recreational vehicle (RV) having a sliding door because the fuel door 110 may be damaged by the sliding door in a case in which the closed state of the fuel door 110 is not recognized when the sliding door is opened.

Consequently, in the present invention, the opening detection switch 300 is installed integrally in the main body 100, such that it is possible to implement structural simplification and easily check whether the fuel door 110 is opened and closed like the related art, and it is possible to implement an aesthetic external appearance of the fuel door housing, unlike the structure in which the locking rod 200 and the opening detection switch 300 are separately installed on the fuel door housing.

Therefore, the present invention makes a configuration of a package layout excellent, thereby improving assembly and manufacturing properties.

FIG. 2 is a view illustrating a state in which the fuel door opener according to various embodiments of the present invention closes the fuel door 110.

As illustrated in FIG. 2, when the locking rod 200 is positioned at the locking position in a state in which the vehicle operates and travels, the opening detection switch 300 does not come into contact with the contact guide 222 within the contact range, thereby allowing the opening detection switch 300 to be turned off.

That is, when the contact member 210 is caught by the catching groove 12a, the contact member 210 is pushed about 5 mm by the rod stopper 12, and thus the movable member 220 may be moved so that the detector 320 of the opening detection switch 300 is positioned within the contact range without coming into contact with the contact guide 222, and as a result, the opening detection switch 300 is turned off, and consequently, a fuel door closing signal is generated.

If the fuel door 110 is intended to be opened for refueling the vehicle as described with reference to FIG. 1, a power transmission means 30, which converts rotational motion into linear motion by using power of a motor 20 and transmits power to the locking rod 200, is controlled by a control signal of a driver, such that the locking rod 200 is retracted so that the locking rod 200 is separated from the catching groove 12a, thereby opening the fuel door 110.

FIG. 3 is a view illustrating a process in which the fuel door opener according to various embodiments of the present invention opens and closes the fuel door 110.

As illustrated in FIG. 3, when the locking rod 200 moves from the unlocking position to the locking position during a process of closing the fuel door 110, the opening detection switch 300 does not come into contact with the contact guide 222 within the contact range, and thus is turned off.

That is, in the case of the opening detection switch 300, when the contact member 210 is pushed by the inclined surface of the rod stopper 12 as the fuel door 110 is closed, the contact member 210 is pushed about 0 to 10 mm.

Therefore, since the movable member 220 may be moved so that the detector 320 is positioned within the contact range without coming into contact with the contact guide 222, the opening detection switch 300 is turned off, and as a result, a fuel door closing signal is generated, and the fuel door 110 is fully closed as illustrated in FIG. 2.

According to the present invention, the opening detection switch mounted integrally in the fuel door opener selectively comes into contact with the locking rod as the locking rod moves in accordance with opened and closed states of the fuel door, and as a result, it is possible to easily check whether the fuel door is opened and closed even though an opening detection switch separately provided is omitted.

Therefore, the present invention may implement an aesthetic external appearance of the fuel door, reduce costs/weight of the fuel door, make a configuration of a package layout excellent, and improve assembly and manufacturing properties.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fuel door opener comprising:
    a main body coupled in a fuel door housing;
    a locking rod which is disposed to be movable between a locking position where the fuel door is locked and an unlocking position where the fuel door is unlocked in accordance with opened and closed states of the fuel door; and
    an opening detection switch disposed in the main body adjacent to the locking rod, and detecting the opened and closed states of the fuel door by being selectively caught on the locking rod as the locking rod is positioned at the locking position or at the unlocking position,
    wherein the locking rod has a contact guide disposed to set a contact range with the opening detection switch, and
    wherein the contact guide is disposed to be selectively caught on the opening detection switch in the contact range.

2. The fuel door opener of claim 1, wherein the main body is disposed in the fuel door housing so that a first end of the locking rod protrudes and is exposed from the fuel door housing.

3. The fuel door opener of claim 1, wherein the locking rod includes:

a contact member which protrudes on the fuel door housing to selectively contact a rod stopper provided on the fuel door;

a movable member which is coupled to the contact member, and selectively moves to the locking position or the unlocking position as the rod stopper and the contact member come into contact with each other; and an elastic member coupled to an outer circumferential surface of the movable member, and providing elastic force to the movable member that moves from the locking position to the unlocking position.

4. The fuel door opener of claim 3, wherein the opening detection switch includes:

a body disposed in the main body adjacent to the locking rod; and a detector hingedly coupled to the body to detect the opened state of the fuel door by being caught by the contact guide as the locking rod moves to the unlocking position.

5. The fuel door opener of claim 4, wherein the contact range comprises a range in which the detector is not caught on the contact guide when the movable member moves to the locking position, and the detector is caught on the contact guide when the movable member moves to the unlocking position.

6. The fuel door opener of claim 3, wherein the rod stopper includes a catching groove formed so that the contact member is caught in the catching groove when the fuel door is closed, and allowing the movable member to be fixed at the locking position by pressing against the contact member.

7. The fuel door opener of claim 1, wherein the contact guide is disposed as a groove in a longitudinal direction of the movable member to be selectively caught on the opening detection switch in the contact range.

* * * * *